(12) United States Patent
Belliveau (10) Patent No.: US 7,206,023 B2
(45) Date of Patent: Apr. 17, 2007

(54) IMAGE PROJECTION LIGHTING DEVICES WITH PROJECTION FIELD LIGHT INTENSITY UNIFORMITY ADJUSTMENT (76) Inventor: Richard S. Belliveau, 10643 Floral Park, Austin, TX (US) 78759

( * ) Notice: Subject to any disclaimer, the term of this patent is extended or adjusted under 35 U.S.C. 154(b) by 965 days.

(21) Appl. No.: 10/319,366

(22) Filed: Dec. 13, 2002

(65) Prior Publication Data
US 2004/0114043 A1   Jun. 17, 2004

(51) Int. Cl.
H04N 5/222 (2006.01)
(52) U.S. Cl. ............... 348/370; 348/744; 359/292; 353/94
(58) Field of Classification Search ........... 348/370, 348/371, 744; 359/292; 353/94
See application file for complete search history.

(56) References Cited

U.S. PATENT DOCUMENTS

| 5,113,332 A | 5/1992 | Richardson | 362/282 |
|---|---|---|---|
| 5,828,485 A | 10/1998 | Hewlett | 359/291 |
| 5,829,868 A | 11/1998 | Hutton | 362/276 |
| 5,988,817 A | 11/1999 | Mizushima et al. | 353/94 |
| 6,057,958 A | 5/2000 | Hunt | 359/291 |
| 6,099,128 A | 8/2000 | Jessl | 353/51 |
| 6,188,933 B1 | 2/2001 | Hewlett | 700/19 |
| 6,208,087 B1 | 3/2001 | Hughes et al. | 315/291 |
| 6,219,093 B1 | 4/2001 | Perry | 348/135 |
| 6,412,972 B1 | 7/2002 | Pujol et al. | 362/272 |
| 6,513,938 B2 * | 2/2003 | Kubota et al. | 353/94 |
| 6,588,944 B2 | 7/2003 | Harris | 385/88 |
| 6,637,887 B2 * | 10/2003 | Yamanaka | 353/30 |
| 6,671,005 B1 | 12/2003 | Pujol et al. | 348/771 |
| 6,765,544 B1 | 7/2004 | Wynne Willson | 345/6 |
| 2001/0026325 A1 * | 10/2001 | Iida | 348/370 |
| 2002/0113882 A1 * | 8/2002 | Pollard et al. | 348/370 |

* cited by examiner

Primary Examiner—Tuan Ho
Assistant Examiner—Gevell Selby
(74) Attorney, Agent, or Firm—Walter J. Tencza, Jr.

(57) ABSTRACT

A lighting system is disclosed comprised of a plurality of image projection lighting devices including a first image projection lighting device. The first image projection lighting device is typically comprised of a microprocessor and a camera. The microprocessor and/or a command from a central controller can cause the camera to capture a first image of the projection surface and can cause the first image projection lighting device to produce a projected light which substantially reduces the nonuniformity of light intensity on the projection surface from the plurality of image projection lighting devices.

11 Claims, 10 Drawing Sheets

IMAGE PROJECTION LIGHTING DEVICES WITH PROJECTION FIELD LIGHT INTENSITY UNIFORMITY ADJUSTMENT

FIELD OF THE INVENTION

The present invention relates to lighting systems that are digitally controlled and to the light fixtures used therein, and more particularly to such lighting systems as well as to multiparameter lights that have an image projection lighting parameter and a camera and that are useful in such lighting systems.

BACKGROUND OF THE INVENTION

Lighting systems are formed typically by interconnecting many light fixtures by a communications system and providing for operator control from a central controller. Such lighting systems may contain multiparameter light fixtures, which illustratively are light fixtures having two or more individually remotely adjustable parameters such as beam size, color, shape, angle, and other light characteristics. Multiparameter light fixtures are widely used in the lighting industry because they facilitate significant reductions in overall lighting system size and permit dynamic changes to the final lighting effect. Applications and events in which multiparameter light fixtures are used to great advantage include showrooms, television lighting, stage lighting, architectural lighting, live concerts, and theme parks. Illustrative multi-parameter light devices are described in the product brochure entitled "The High End Systems Product Line 2001" and are available from High End Systems, Inc. of Austin, Tex.

A variety of different types of multiparameter light fixtures are available. One type of advanced multiparameter light fixture which is referred to herein as an image projection lighting device ("IPLD") uses a light valve to project images onto a stage or other projection surface. A light valve, which is also known as an image gate, is a device for example such as a digital micro-mirror ("DMD") or a liquid crystal display ("LCD") that forms the image that is projected. U.S. Pat. No. 6,057,958, issued May 2, 2000 to Hunt, incorporated herein by reference, discloses a pixel based gobo record control format for storing gobo images in the memory of a light fixture. The gobo images can be recalled and modified from commands sent by a control console. A pixel based gobo image is a gobo (or a projection pattern) created by a light valve like a video projection of sorts. U.S. Pat. No. 5,829,868, issued Nov. 3, 1998 to Hutton, incorporated by reference herein, discloses storing video frames as cues locally in a lamp, and supplying them as directed to the image gate to produce animated and real-time imaging. A single frame can also be manipulated through processing to produce multiple variations. Alternatively, a video communication link can be employed to supply continuous video from a remote source.

U.S. Pat. No. 5,828,485, issued Oct. 27, 1998 to Hewlett, incorporated herein by reference, discloses the use of a camera with a digital micro mirror equipped light fixture for the purpose of following the shape of the performer and illuminating the performer using a shape that adaptively follows the performer's image. A camera capturing the image preferably is located at the lamp illuminating the scene in order to avoid parallax. The image can be manually investigated at each lamp or downloaded to some central processor for this purpose.

United States patent application titled "METHOD, APPARATUS AND SYSTEM FOR IMAGE PROJECTION LIGHTING", inventor Richard S. Belliveau, publication no. 20020093296, Ser. No. 10/090,926, filed on Mar. 4, 2002, incorporated by reference herein, describes prior art IPLDs with cameras and communication systems that allow camera content, such as in the form of digital data, to be transferred between IPLDs.

IPLDs of the prior art use light from the projection lamp that is sent though a light valve and focused by an output lens to project images on a stage. The light cast upon the stage by the IPLD is then imaged by the camera. U.S. Pat. No. 6,219,093 to Perry titled "Method and device for creating the facsimile of an image", incorporated herein by reference describes a camera that may be an infrared camera for use with a described lighting device that uses liquid crystal light valves to project an image. "Accordingly the camera and light are mounted together for articulation about x, y, and z axes as is illustrated in FIG. 1" (Perry, U.S. Pat. No. 6,219,093, col. 4, line 59).

The prior art patent to Perry, U.S. Pat. No. 6,219,093 makes use of a camera to distinguish objects in the camera's field from other objects. The distinguished object as imaged by the camera is then illuminated by the projected light passing through the light valves so as to only illuminate the distinguished object. The objects may be provided with an infrared emitter or reflector which interacts with a receiver or camera. Perry relies on the light produced from the projection lamp and the light valves to provide the illumination to the scene where the camera images or separate emitters or reflectors are provided with the objects on the stage. The Perry prior art patent describes its invention as a camera/light unit.

United States patent application titled "METHOD AND APPARTUS FOR CONTROLLING IMAGES WITH IMAGE PROJECTION LIGHTING DEVICES", inventor Richard S. Belliveau, Ser. No. 10/206,162, filed on Jul. 26, 2002, incorporated by reference herein, describes control systems for IPLDs and IPLDs with cameras and more specifically the control of images in a lighting system that includes multiparameter lights having an image projection lighting parameter.

United States patent application titled "IMAGE PROJECTION LIGHTING DEVICES WITH VISIBLE AND INFRARED IMAGING", inventor Richard S. Belliveau, Ser. No. 10/290,660 filed on Nov. 8, 2002, incorporated by reference herein, describes IPLDs that contain cameras that can capture both visible and infrared images.

IPLDs may project images such as video images or still images or they may project only light with no image. The projection of images by IPLDs is useful in creating a visual scene on the projection surface that can create an animation or a representation of objects. The projection of only light with no image on the projection surface such as white light or colored light is useful in providing illumination of the projection surface. Most often when illumination of the projection surface without images is required the intensity of the illumination should be uniform across the projection surface.

U.S. Pat. No. 6,188,933 to Hewlett discloses "Another possible DMD effect is the simulation of a beam field distribution or profile, e.g., a cosine shaped profile for the spotlight. The inventors recognized that spotlights are often overlapped with other spotlights at their edges. The area of overlap can cause a bright spot at those edges. The DMD is used to form a spotlight with edge portions that have intensities that are lower than the intensity in the center of the beam. The rate of intensity drop off is preferably a cosine function. In this way, when the two edge portions of two spotlights are placed one over the other, the overlap does not appear to be overly bright. However, such variable profiles will not be desired in all situations. A variable brightness profile will be desired in situations where multiple beams will be overlapping at their edges. However, other effects, such as illuminating a gobo, will be better illuminated using flat intensity profiles." Hewlett describes varying the field distribution of the entire projected light. It will be seen in the following disclosure that the invention provides a better method of providing a uniform light on a projection surface using multiple IPLDs.

When multiple IPLDs of the prior art project light onto a projection surface such as a stage often the projected light from one IPLD overlaps another. The overlapped areas visibly displays an intensity increase because the projected light in the overlapped areas can be effectively double that compared to the non-overlapping areas. In some cases the overlapped areas may involve three or more IPLDs causing the overlapped areas to look distractingly brilliant compared to the nonoverlapped areas. In many applications using multiple IPLDs to light a projection surface it is highly desirable to have uniform intensity across the projection surface.

When IPLDs project images such as video images it is often desirable for the IPLD to be able to project light with the same intensity across the projection field. If the projection field is not uniform such as with more light intensity in the center of the projection field than at the edges, the projected image may have a visual hot spot in the center. This visual hotspot in the center of an IPLD's projected image can be distracting and undesirable when viewed.

When multiple IPLDs or other lighting devices are used to provide lighting for large area projection surfaces such as a stage floor in the prior art, the projection field may be adjusted to provide more light intensity in the center of the projection field than in the edges. The thinking being that where the IPLDs or other lighting devices overlap the intensity at the edges of each projection field is less therefore the overlapped areas will not be so intense compared to the center. This prior art method only results in reducing the distraction caused by overlapped areas and if there is the overlapping of three IPLDs projection fields the problem with visible higher intensity at that point still persists.

SUMMARY OF THE INVENTION

The present invention in one or more embodiments allows a particular IPLD when used with a plurality of IPLDs to illuminate a projection surface to recognize how other IPLDs may affect its projection field on the projection surface and make corrections of intensity to the projection field to reduce the hot spot in the overlapped areas. The IPLD can make automatic corrections to the overlapped areas by reducing the intensity to those areas and creating a uniform intensity across the projection field even though other IPLDs may overlap the projection field.

A microprocessor or processor of an IPLD of one or more embodiments of the present invention uses an integrated camera to capture a first image of the projection surface before projecting a first light onto the projection surface. The captured image of the projection surface is stored in a memory of the IPLD. Next the IPLD projects a first light onto the projection surface and the camera captures a second image of the projection surface. The microprocessor of the IPLD then compares the first image and the second image to each other to see how the first image is affected by the second image. The difference between the first image and the second image is a third image. The third image is the image created by the projected first light from the IPLD. The third image may have varying intensities associated with the third image. The microprocessor of the IPLD acts on the third image to create a corrected light projection image or a second light with the intensities corrected to be more uniform over the third image when projected on the projection surface. The second light may be stored in the memory of the IPLD for later recall by a central controller.

DETAILED DESCRIPTION OF THE DRAWINGS

Figure 1:
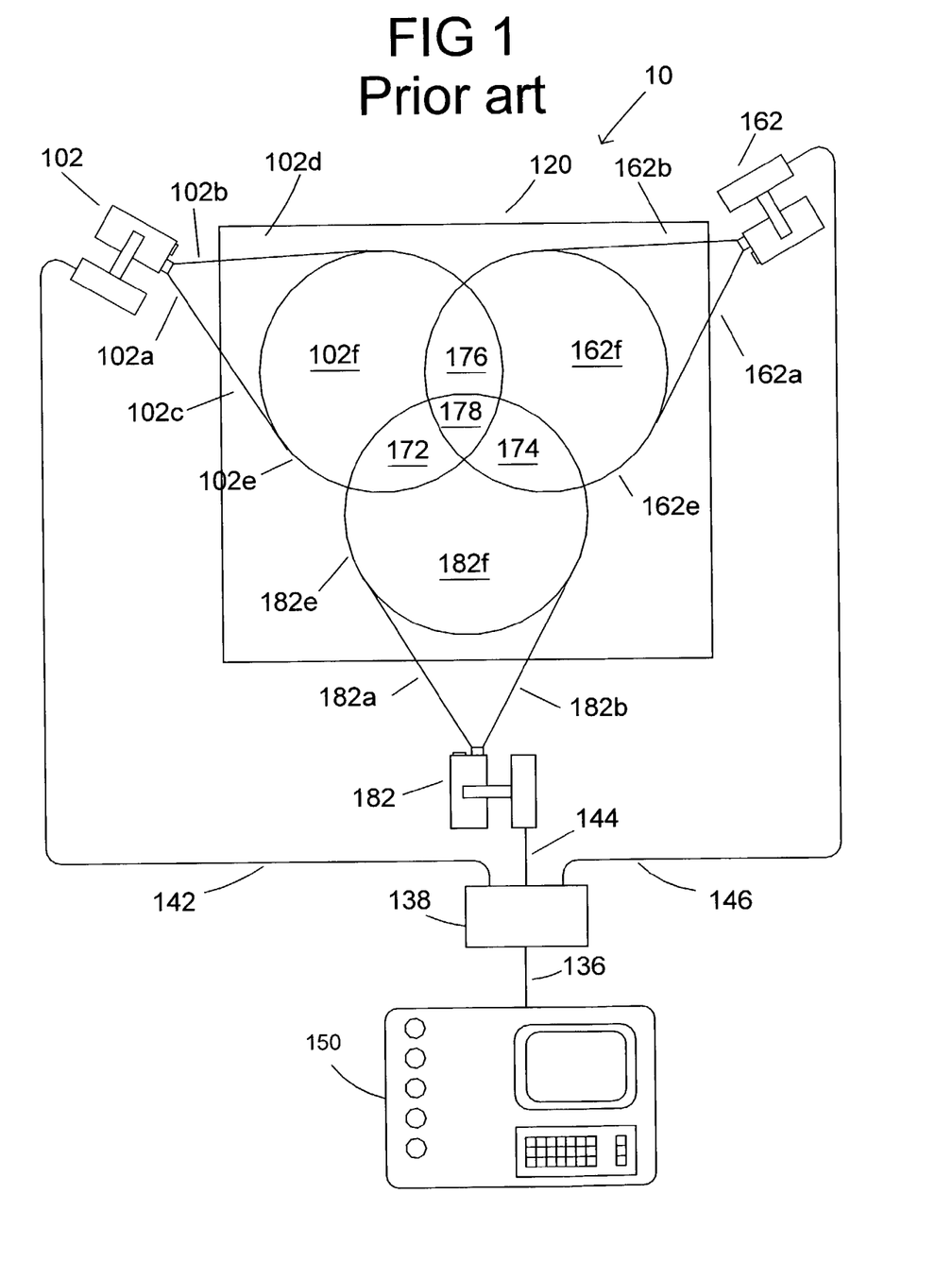
FIG. 1 shows a prior art lighting system or apparatus.

FIG. 1 shows an apparatus or prior art image projection lighting device ("IPLD") lighting system 10 comprised of a central controller 150, a communications interface 138, an IPLD 102, an IPLD 162, and an IPLD 182. The IPLDs 102, 162, and 182 are electrically connected by communications lines 142, 146, and 144, respectively, to the communications interface 138. The communications interface 138 is electrically connected to the central controller 150 by communications line 136. The central controller 150 may be a dedicated control console or a personal computer system.

Three IPLDs, 102, 162, and 182 are shown for simplification, although many more IPLDs such as for example thirty IPLDS each one like any one of 102, 162, and 182 could be used in a lighting system or apparatus, such as apparatus 10. The communications interface 138 may be a router or hub as known in the communications art.

A projection surface 120 which may be a stage is shown. The three IPLDs 102, 162 and 182 are shown illuminating the projection surface 120 with projected light. IPLD 102 has a projection field established by lines 102a and 102b. A circle 102e represents the projected light from the IPLD 102 onto the projection surface 120. Circles are shown for the projected light however the extremity of the projected light may be rectangular or another shape The IPLD 162 has a projection field established by lines 162a and 162b. The circle 162e represents the projection field of projected light from the IPLD 162. The IPLD 182 has a projection field established by lines 182a and 182b. The circle 182e represents the projection field of projected light from 182.

Four overlapping areas or regions of light are created by the three IPLDs shown. Areas or regions 172, 174 and 176 represent overlapping light from two of the IPLDs that can cause a visible distraction to the audience viewing the stage that requires uniform illumination. Area or region 178 represents overlapping light from three IPLDs and as such is generally three times the intensity and can cause a greater visible distraction than an overlapped area created by two IPLDs.

Figure 2:
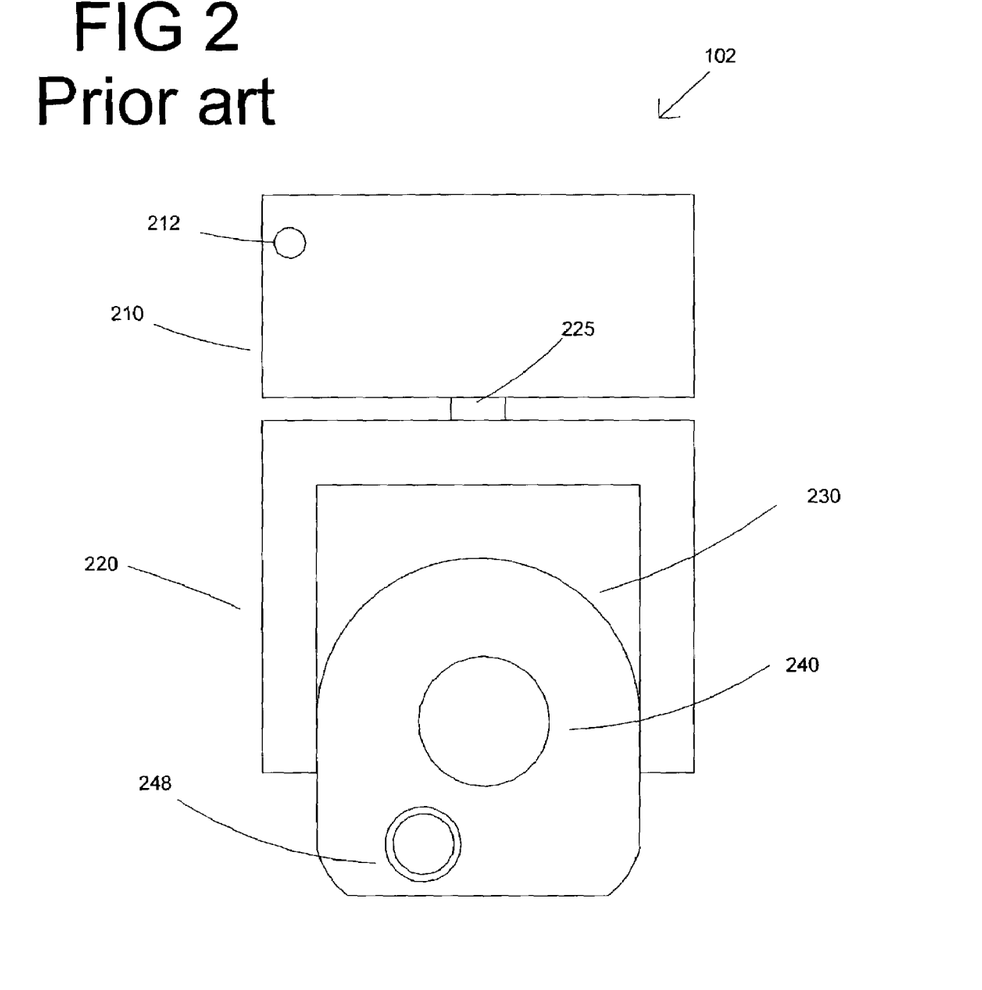
FIG. 2 shows a front view of a prior art image projection lighting device for use in the prior art system of FIG. 1.

FIG. 2 shows a front view of the IPLD 102 of the prior art. The IPLD 102 includes a base or electronics housing 210, a yoke 220, and a lamp housing 230. The IPLDs 162 and 182 of FIG. 1 may each be identical to the IPLD 102 of FIG. 2.

Figure 3:
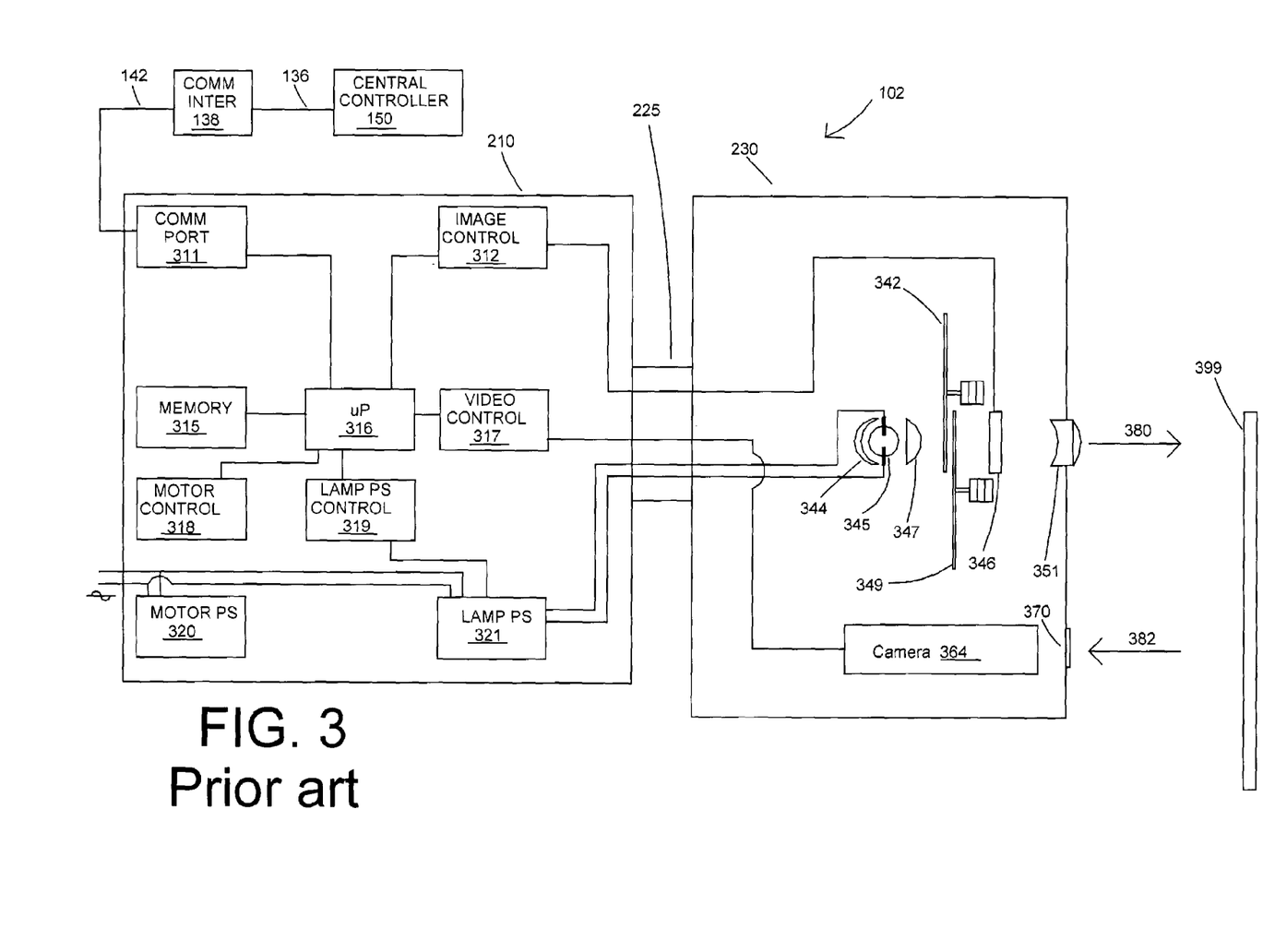
FIG. 3 is a block diagram showing prior art components within a base housing and within a lamp housing of the image projection lighting device of FIG. 2.

The base housing 210 of the IPLD 102 includes a connection point 212 for electrically connecting a communications line, such as communications line 142 shown in FIG. 1. The yoke 220 is physically connected to the housing 210 by a bearing 225 which allows the yoke 220 to pan or rotate in relation to the electronics housing 210. The lamp housing 230 is rotatably connected to the yoke 220. The lamp housing 230 typically contains optical components. An exit aperture 240 is shown for projecting light from a projection lamp, such as lamp 345, in FIG. 3, inside the lamp housing 230. The projection lamp 345 in FIG. 3, is shown as a single lamp but it is known in the prior art to use two or more projection lamps working as a single projection lamp. An aperture 248 is shown for allowing a camera 364 shown in FIG. 3, within the lamp housing 230 to receive and capture images. IPLD 102 is shown with a separate base housing 210 and lamp housing 230 however it is known in the art to produce an IPLD with a single housing using a mirror to position the projected light.

FIG. 3 is a prior art block diagram showing components within or part of the base housing 210 and within or part of the lamp housing 230 of the IPLD 102. FIG. 3 also shows the central controller 150. The components within or part of the base housing 210 include a communications port (shown as "comm port") 311, image control 312, memory 315, microprocessor or processor 316, video control 317, motor control 318, lamp power supply control 319, motor power supply 320 and lamp power supply 321. The components within or part of the lamp housing 230 include a filter assembly 342, a mirror 344, a projection lamp or projection light source 345, a light valve 346, a condensing lens 347, a filter assembly 349, a focusing lens 351, a camera 364, and an aperture 370.

The central controller 150 outputs address and control commands over a communications system which may include communications interface 138 of FIG. 1. The communications interface 138 is connected to the communications port 311 by communications line 142 as shown in FIG. 3. The image control 312 of the electronics housing 210 provides control signals to the light valve 346 in the lamp housing 230. The microprocessor 316 in the electronics housing 210 provides control signals to the image control 312. The microprocessor 316 is shown electrically connected to the memory 315. The memory 315 stores the computer software operating system for the IPLD 102 and possibly different types of content as well as modified projection images used to form images at the light valve 346 of the lamp housing 230. The light valve shown as 346 is a transmissive type light valve where light from the projection lamp 345 is directed to the light valve 346 to be transmitted through the light valve 346 to the lens 351. As known in the prior art a light valve can be a reflective light valve where light from the projection lamp 345 is directed to the light valve 346 to be reflected from the light valve 346 to the lens 351.

The motor control 318 is electrically connected to motors. The electrical connection to the motors is not shown for simplification. The motors may be stepping motors, servomotors, solenoids or any other type of actuators. The motor control 318 provides the driving signals to the motors used with filter assemblies 342 and 349 and for pan and tilt motors (not shown). Filter assemblies 342 and 349 may be rotatable aperture wheels as known in the art. The aperture wheels, if used for filter assemblies 342 and 349, may be used to vary color or pattern parameters.

The motor control 318 is electrically connected to receive control signals from the microprocessor 316. Two power supplies are shown in FIG. 3. A motor power supply 320 is shown for supplying energy to the motors and a lamp power supply 321 is shown for supplying power to the main projection light source or lamp 345. A lamp power supply control interface 319 is electrically connected to the microprocessor 316 to receive control signals from the microprocessor 316 and signals are sent from the lamp power supply interface 319 to the lamp power supply 321 for controlling the main projection light source or lamp 345.

The IPLD 102 may include at least two different housings, such as the base or electronics housing 210 and the lamp housing 230 to facilitate remote positioning of the lamp housing 230 in relation to the base housing 210. The lamp housing 230 contains the optical components used to project light images upon a stage or projection surface 399 from focusing lens 351 in the direction of arrow 380, outwards from the IPLD 102. The lamp housing 230 may be connected to a bearing mechanism 225 that facilitates pan and tilt of the lamp housing 230 in relation to the base or electronics housing 210. The bearing mechanism 225 is shown simplified. The motors that would be used for pan and tilt are not shown for simplification.

The window aperture 370 of the lamp housing 230 is shown in FIG. 3, for allowing input light for the reception of images traveling in the direction of arrow 382 from the projection surface 399 to the camera 364. The camera 364 may be a type of camera known in the art such as a device that receives light images with a contained camera sensor and converts the light images into electronic image data or signals. The camera 364 may be of a type, as known in the art, which may be constructed of only a camera sensor or the camera 364 may contain other optical components in the camera sensor optical path along with suitable control electronics that may function to zoom and focus the camera. The projection lamp 345 has its light energy collected by the collecting mirror 344 and a condensing lens 347. The collected light from the projection lamp 345 passes through the condensing lens 347. Next the light passes though filter assemblies 342 and 349. The light then passes through the light valve 346 and the focusing lens 351 and travels in the direction of the arrow 380.

The video control interface 317 of the electronics housing 210 sends image data or signals as received from the camera 364 to the microprocessor 316. The microprocessor 316 may send this image data or signals to the communications port 311 for transmission back to the central controller 150 or to other IPLDs on the communications system or apparatus 10, such as IPLDs 162 and 182 connected to communication interface 138 in FIG. 1. The communications port 311 may be a part of the processor 316, the communications port 311 can be any device capable of receiving the communication sent over the communications system. The camera 364 may be sensitive to infrared light, to visible light, or both. The other IPLDs on the network or apparatus 10, such as IPLD 162 and IPLD 182, may use the image data received from the IPLD 102 by projecting the images that were captured by the camera 364 and thus originated at IPLD 102. The general capturing of images and sending image data to other lighting devices is described in detail in pending patent application Ser. No. 10/090,926, to Richard S. Belliveau, the applicant herein, publication no. 20020093296, filed on Mar. 4, 2002, titled "Method, apparatus and system for image projection lighting", which is incorporated by reference herein.

Figure 4:
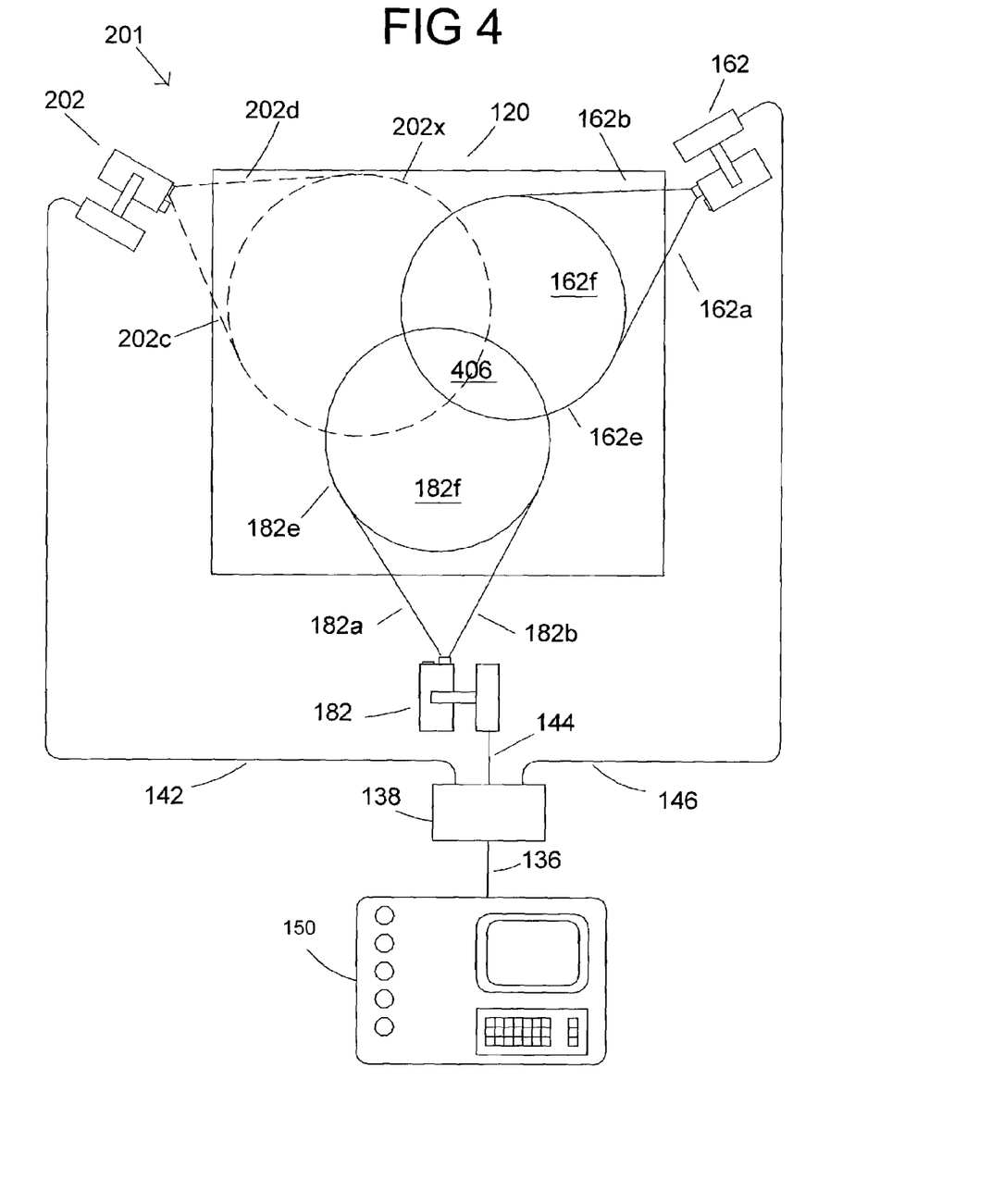
FIG. 4 shows a lighting system, including an image projection lighting device, in accordance with an embodiment of the present invention with a projecting light.
Figure 5:
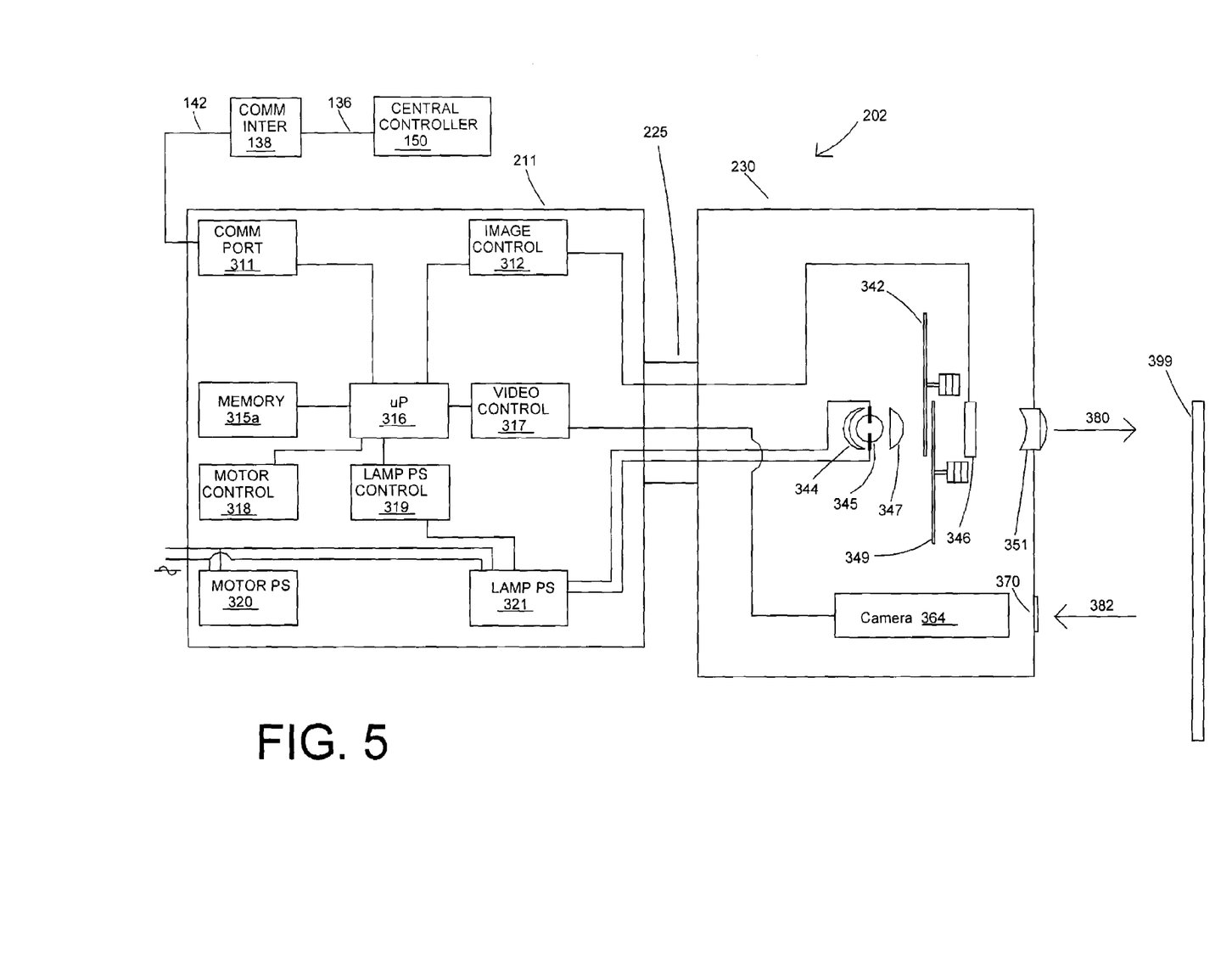
FIG. 5 is a block diagram showing components within a base housing and within a lamp housing of the image projection lighting device in accordance with an embodiment of the present invention for use in the lighting system of FIG. 4.

FIG. 4 shows an IPLD lighting system 201 in accordance with an embodiment of the present invention. The IPLD lighting system 201 is the same as the lighting system 10 of the prior art of FIG. 1 except that the IPLD 102 has been replaced with the IPLD 202. The IPLD 202 is the same as the prior art IPLD 102, except that as shown in FIG. 5 the memory 315a is shown instead of the memory 315 of FIG. 3. The memory 315a contains the operational software which is executed by the processor 316. Placing memory 315a into the IPLD 202 causes the operation of the processor 316 to be different from the operation of the processor 316 in the IPLD 202 which is controlled by memory 315. The memory 315a and the memory 315 may actually be comprised of the same computer chip but may differ in the computer software instructions stored therein. The different functions provided for IPLD 202 versus IPLD 102, could be provided in other ways for example, the processor 316 could be replaced by another processor which functions differently.

The microprocessor 316 of the IPLD 202 executes an operation program stored in the memory 315a which causes the microprocessor 316 to use an integral camera, such as camera 364 of FIG. 5, to capture an image of the projection surface 120 before projecting light from the projection lamp 345 of FIG. 5. The camera field is established by dashed lines 202c and 202d shown in FIG. 4. The circle 202x represents the camera field and image area on the projection surface 120. The camera imaging area or field 202x is shown by way of example as a circle in FIG. 4, but the extremity of the imaging area may be rectangular or another shape. The captured camera image as shown as a dashed circle as 202x in FIG. 4, is sent as data to the video control interface 317 of FIG. 5. The video control interface 317 sends the captured camera image data to the microprocessor 316. The image data may be a digital representation of the pixels of the camera image. The microprocessor 316 is programmed by the memory 315a to relay the captured camera image data to the memory 315a and to store the captured camera image data in the memory 315a as a first image. The first image (or set of first image data) is the image of the projection surface 120 without the influence of a first light projected by the IPLD 202.

Also shown in FIG. 4 is the overlapped area 406 that is formed by the projected light 162f and 182f from IPLD 162 and 182 respectively. Since IPLD 202 is not projecting light from the projection lamp 345 of FIG. 3, the overlapped area 406 is basically a doubled intensity light area.

Figure 6:
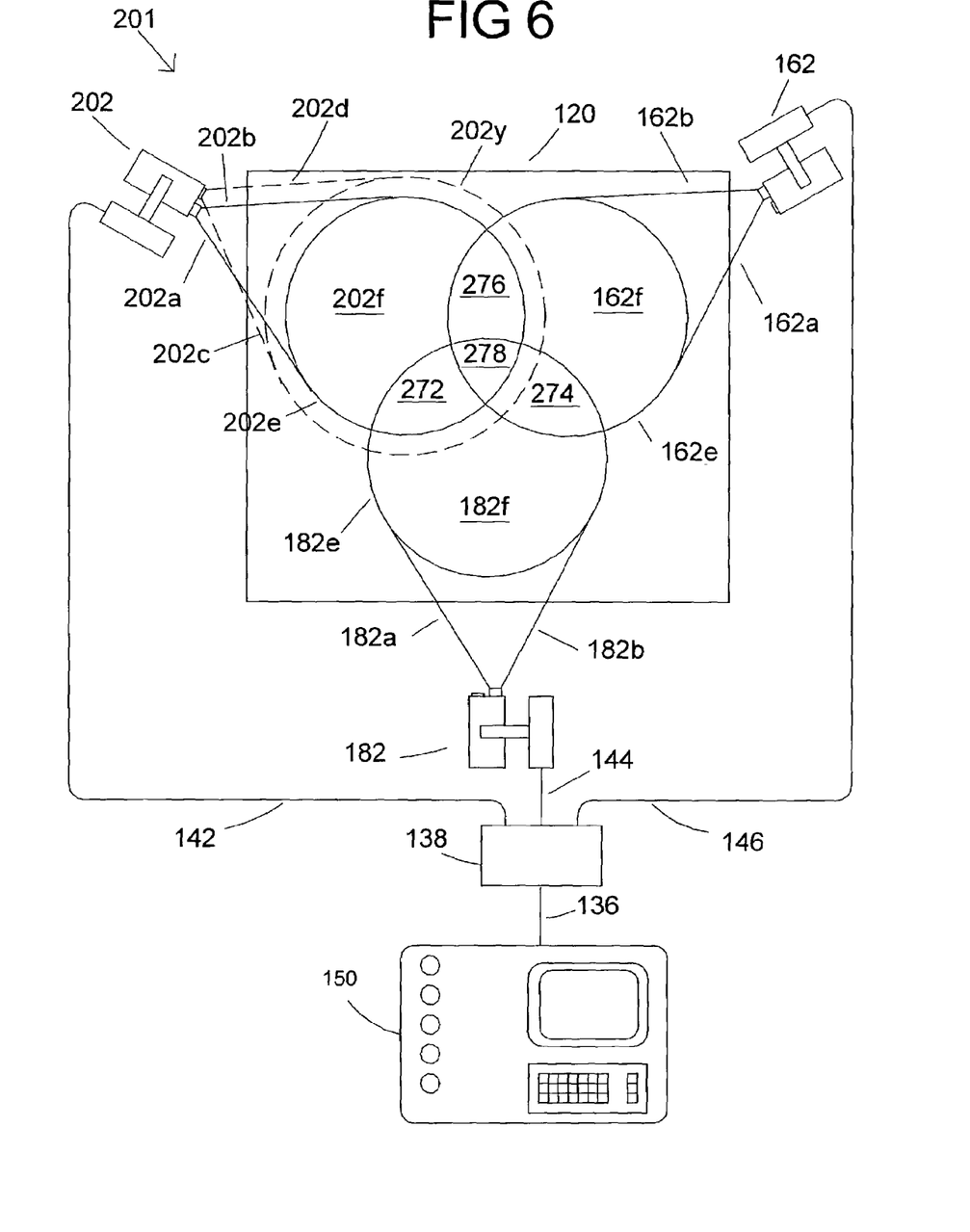
FIG. 6 shows the lighting system of FIG. 4 with an integral camera of the image projection lighting device of an embodiment of the present invention capturing a second image of the projection surface while the image projection lighting device is projecting a first light.

FIG. 6 shows the IPLD lighting system 201 of FIG. 4 at a next stage or step of an embodiment of the present invention. The components of FIG. 6 are identical to FIG. 4, except for the following explained differences. Unlike the diagram of FIG. 4, the IPLD 202 is projecting a first light onto the projection surface 120. The projection field is shown by lines 202a and 202b. The circle 202e represents the projected light from the IPLD 202 onto the projection surface 120. Circles are shown for the projected light however the extremity of the projected light may be rectangular or another shape. IPLD 162 has a projection field established by lines 162a and 162b. The circle 162e represents the projected light in the projection field from the IPLD 162. The IPLD 182 has a projection field established by lines 182a and 182b. The circle 182e represents the projected light in the projection field from the IPLD 182.

Referring to FIGS. 5 and 6, the microprocessor 316 executes the operational program in memory 315a to cause the camera 364 of the IPLD 202 to capture a second image of the projection surface 120 when the IPLD 202 is projecting a first light from the projection lamp 345. The captured camera image is shown as a dashed circle as 202y in FIG. 6. The captured image or data representing the captured image is sent to the video control interface 317 of the IPLD 202, shown in FIG. 5. The video control interface 317 sends the captured camera image data to the microprocessor 316. The microprocessor 316 relays the captured camera image data corresponding to image 202y to the memory 315a and stores the captured camera image data as a second image or data corresponding to a second image. The second image is the image of the projection surface 120 with the influence of a first light projected by the IPLD 202.

Figure 7:
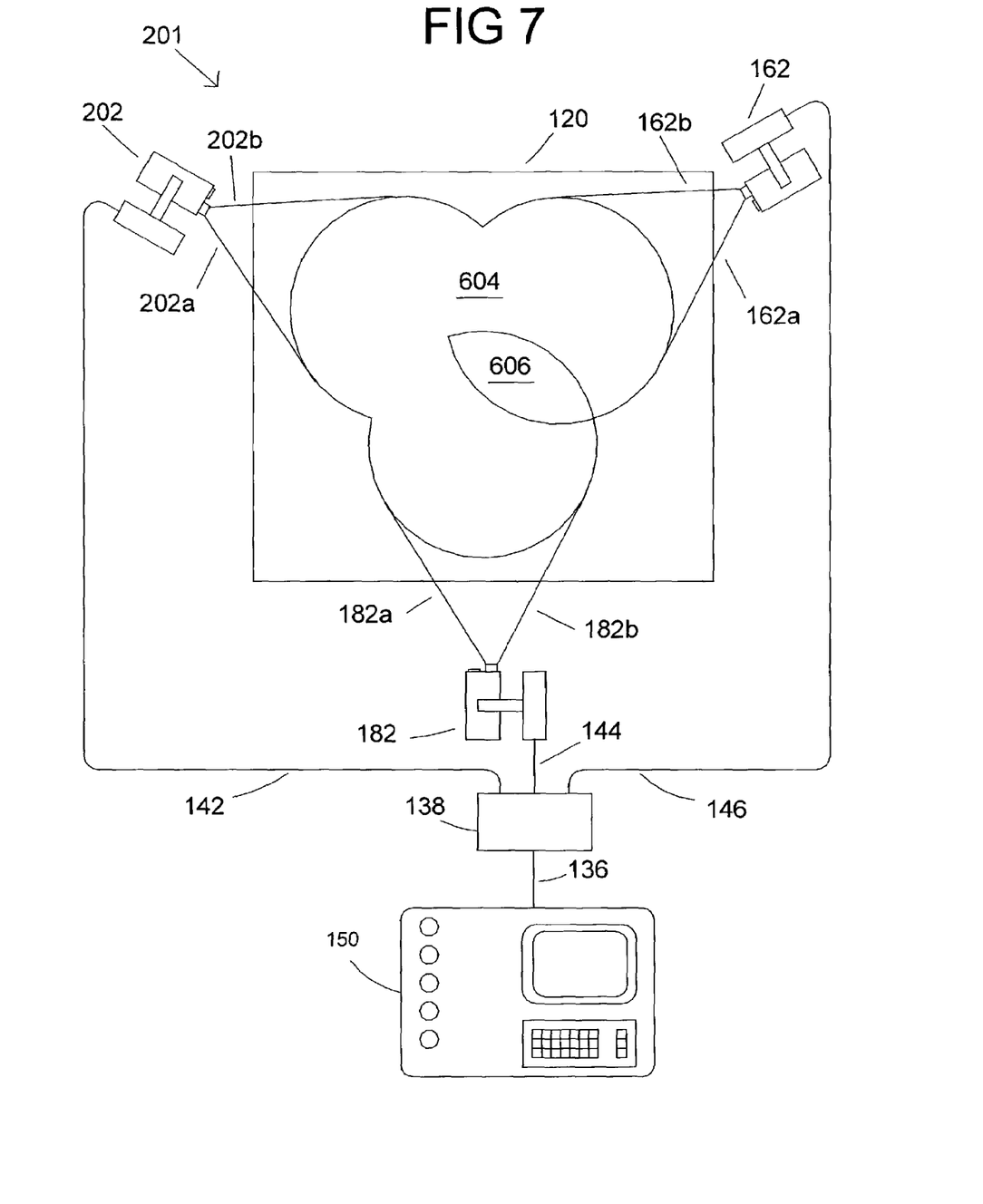
FIG. 7 shows the lighting system of FIG. 6 after the image projection lighting device of an embodiment of the present invention has used the first images and the second images to determine and produce a corrected projection image or second light.

FIG. 7 shows the IPLD lighting system 201 at another possible stage or step in accordance with an embodiment of the present invention. The components of FIG. 7 are identical to FIG. 6 except for the following explained differences. The camera 364 of the IPLD 202 is not shown capturing an image of the projection surface 120 as it is not necessary at this stage. In FIG. 7, the projected light from the IPLD 202 has been altered from the first projected light of the IPLD 202 in FIG. 6. The microprocessor 316 of FIG. 5, by executing the program in memory 315a, accomplishes this by comparing the first captured image data, i.e. from the image corresponding to 202x of FIG. 4, and the second captured image data, i.e. the image corresponding to 202y of FIG. 6, to determine how the first light from the IPLD 202 (also called the second image) affects the first image. In this way the processor 316 of FIG. 5 of IPLD 202 can know how the first light projected from the projection lamp 345 of FIG. 6 affects the projection surface 120. The microprocessor 316 causes a third image of the affected area of the projection surface 120 of FIG. 6 to be extracted from the comparison of the first image (corresponding to 202x) and the second image (corresponding to 202y).

The third image of the projection surface is the area that has been affected by the illumination of the first light on the projection surface. The microprocessor 316 adjusts the third image to create a fourth image so that a new corrected light projection image called the second light can be projected by IPLD 202 that provides for the most uniform light of the affected area on the projection surface 120.

The microprocessor 316 then sends the corrected light projection image (i.e. second light) data to the image control 312 that in turn sends the appropriate control signals to the light valve 346. The corrected light projection image or the second light projected by the IPLD 202 as shown by lines 203a and 203b in FIG. 7 may be less uniform than the first projected light as shown by lines 202a and 202b in FIG. 6 as the second light projection light may have non uniform distinct shaped areas that have been specially created by adjustment of the third image by the microprocessor 316 of the IPLD 202 to result in a substantially uniform lighting of the affected area on the projection surface 120. When the corrected light projection image is used by the IPLD 202 to project light from the projection lamp 345 as shown in FIG. 7 the result is an improvement in the overlapping areas on the projection surface 120. In FIG. 7 it can be seen that the overlapped areas 172, 176 and 178 of FIG. 6 are now diminished or gone and only the overlapped area 606 is shown. The overlapped area 606 is not within the affected area of IPLD 202 and thus IPLD 202 has no control in correcting this overlapped area on the projection surface 120. In FIG. 7, the IPLD 202 in projecting light created by the corrected light projection image or second light has greatly corrected the uniformity of the projection surface 120 and a substantial uniform area 604 on the projection surface 120 has been created. The creation of distinct areas of nonuniformity in the projected second light is better than the prior art symmetrical variable profile. This allows the IPLD of embodiments of the invention, such as IPLD 202, to produce as much overall intensity across the projection surface without waste. As known in the art, a light valve, such as light valve 346 of FIGS. 3 and 5, is capable of forming many light projection images based upon control signals sent by the image control 312. In accordance with an embodiment of the present invention, the microprocessor 316 calculates the corrected light projection image (also called the second light to be projected by the IPLD 202) from the third image.

Figure 8:
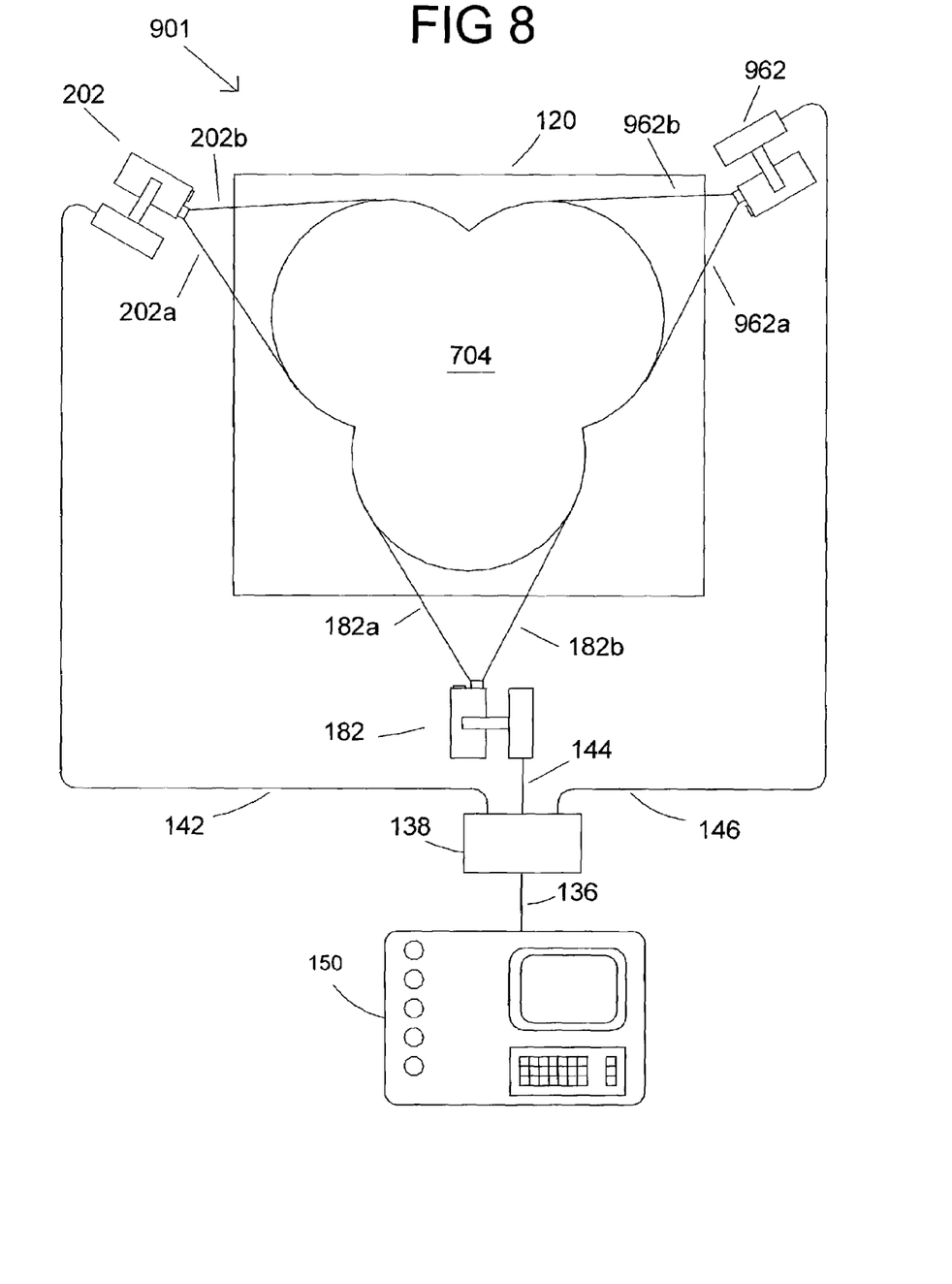
FIG. 8 shows a lighting system wherein two image projection lighting devices in accordance with one or more embodiments of the present invention are provided.

FIG. 8 shows the IPLD lighting system 901. The IPLD lighting system 901 is identical to the IPLD lighting system 201 except that the system 901 has an IPLD 962 in accordance with one or more embodiments of the present invention which is identical to the IPLD 202 while the system 201 has an IPLD 162 of the prior art. The components and operation of the system 901 of FIG. 8 are identical to the system 201 of FIG. 7 except for the following explained differences. For the sake of simplicity in FIG. 8 the integral camera, similar to or identical to camera 364, of the IPLD 962 has already created a first image from FIG. 7.

The IPLD 962 has also created a second image and compared the first image to the second image to create a third image as explained above for IPLD 202. The third image has had the intensities analyzed by a processor, similar to or identical to microprocessor 316 implementing the program in memory 315a, of the IPLD 202, to create a corrected light projection image. FIG. 8 shows the corrected light projection image projected by IPLD 962 thus correcting the intensity of the last remaining overlapping area 606 of FIG. 7 and partial uniform area 604 of FIG. 7 has now been replaced with a fully uniform area 704 on the projection surface 120.

Figure 9B:
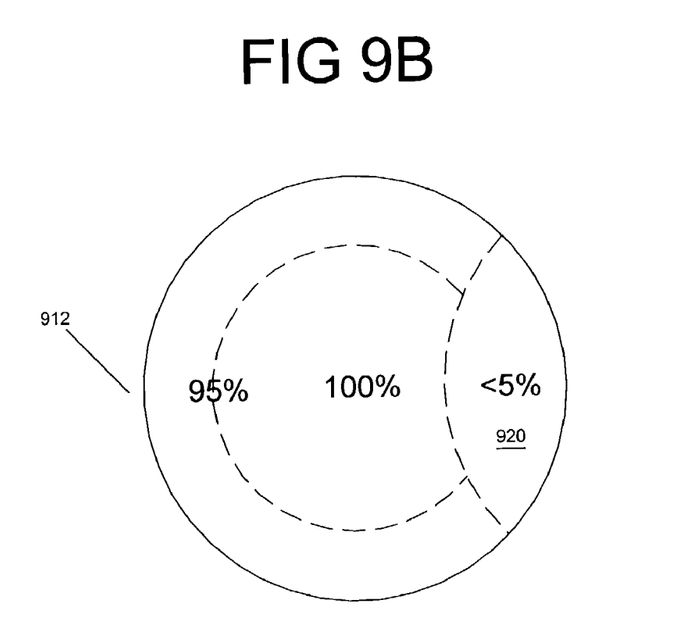
FIG. 9B shows an example of a light beam profile of an embodiment of the present invention.
Figure 10:
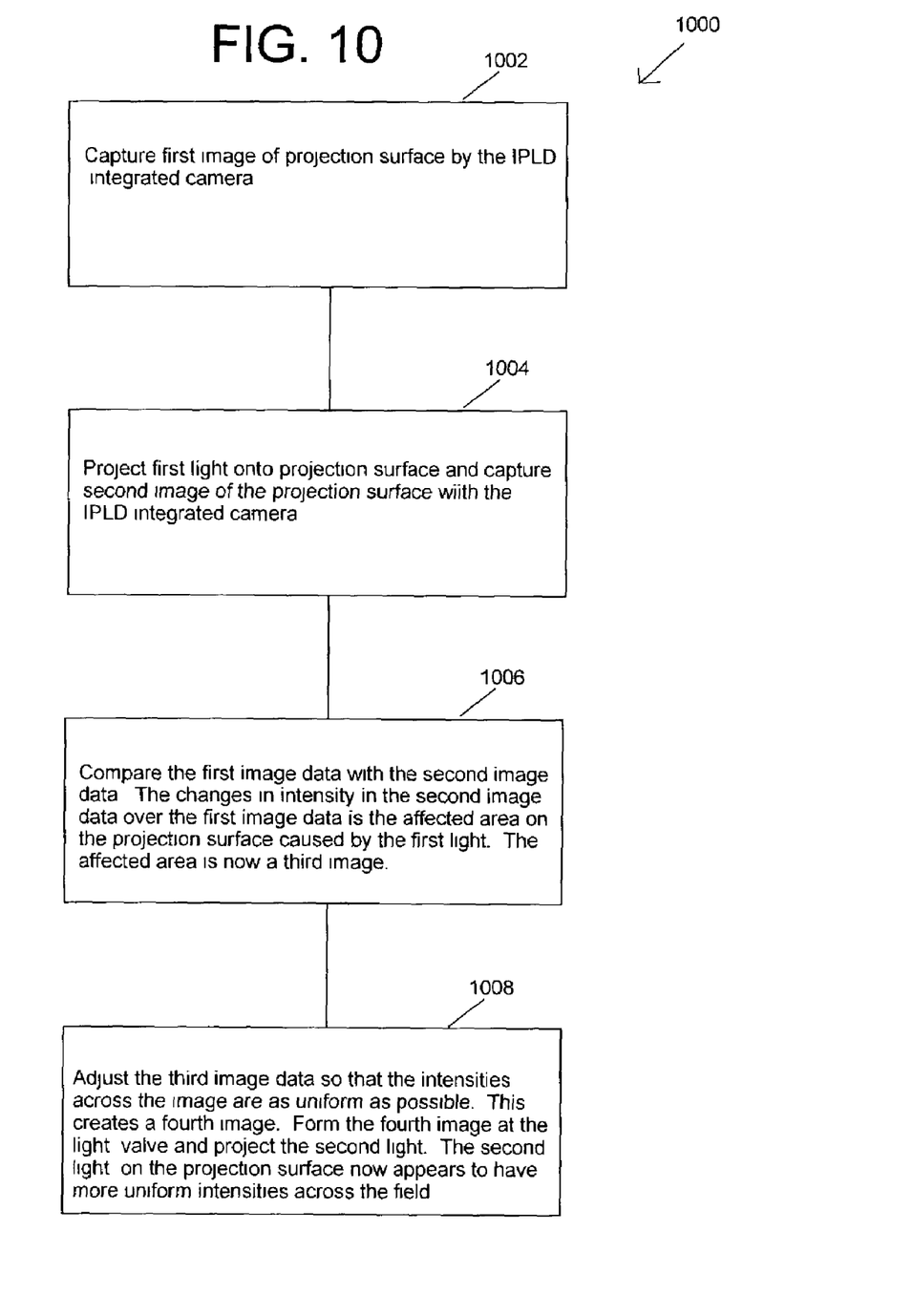
FIG. 10 shows a flow chart of a method in accordance with an embodiment of the present invention.

FIG. 10 shows a flow chart 1000 in accordance with a method of an embodiment of the present invention. At step 1002, an IPLD, such as IPLD 202, captures an image of the projection surface 120 corresponding to 202x of FIG. 4, without projected light from the IPLD 202, as shown in FIG. 4. At step 1004, the IPLD 202 projects a first light onto the projection surface, such as the first light shown by lines 202a and 202b, and circle 202e, projected onto surface 120 and the camera captures the second image corresponding to 202y of FIG. 6. of the projection surface 120. At step 1006, the processor 316 compares the first camera captured image field data corresponding to 202x of FIG. 4 with the second camera captured image field data, corresponding to 202y of FIG. 6. The upward changes in intensity data in the second image data over the first image data is the affected area on the projection surface 120 caused by projected illumination of the first light from the IPLD 202. The affected area is now created as third image data in the memory 315a and/or in the processor 316 of the IPLD 202. At step 1008 the processor 316 adjusts the third image data so that the intensities across the image on the affected area of the projection surface 120, due to the IPLD 202, IPLD 182 and IPLD 962 will be as uniform as possible. The adjusted third image data is now called fourth image data. The fourth image is an image that will be formed on the projection surface 120 by a second light projected from the IPLD 202. The processor 316 sends the necessary control signals to the image control 312 that in turn sends the driving signals reflecting the fourth image data to light valve 346 that causes the IPLD 202 to project a second light. The area spanned on the projection surface by the second light from IPLD 202 is uniform in light intensity if one is looking at the projection surface 120 because the second light takes into account the intensity influences of IPLD 182 and 962 on the affected area of the projection surface 120. The second light projected from IPLD 202 will be non-uniform if one is only looking at the light projected from the IPLD 202 on the projection surface without the additional projected light on the projection surface of IPLD 182 and IPLD 962. FIG. 9B shows an example of a second light or a corrected light projection image.

Figure 9A:
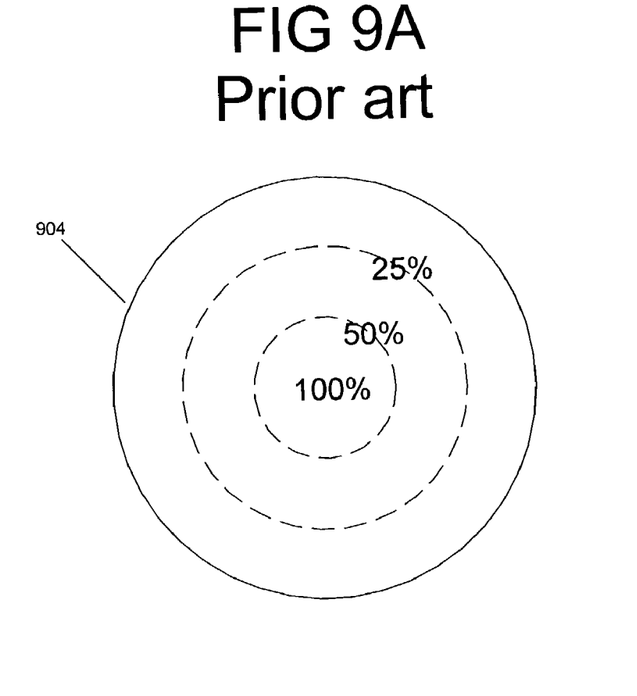
FIG. 9A shows an example of a light beam profile of the prior art.

FIG. 9A shows a projected light profile 904 from a single IPLD of the prior art. This prior art profile can be used in the prior art to attempt to correct the overlapping problems shown in system 10 FIG. 1. The uniformity of the single IPLD projected light on the projection surface 120 varies as shown in FIG. 9A between 100% intensity in the center to 50% intensity at ⅓ the radius to 25% intensity at ⅔ the radius. A lot of light is sacrificed in order to improve only the overlapping areas where two lighting devices or IPLDs of the prior art overlap. FIG. 9B shows an example of what a corrected light projection image in accordance with an embodiment of the present invention or a second light 912 might look like if it were projected alone on the projection surface without the interaction of other ILPDs used to light the projection surface. In this example only a section or distinct area 920 required a reduction in intensity to less than 5%. The center of FIG. 9B is shown as 100% intensity. Since for most IPLDs the goal is uniform illumination the edge of the corrected light projection image is shown as 95% intensity. In the area 920 of the corrected light projection image that received the correction due to an overlap by a second IPLD projected light (a second IPLD light projection is not shown) the corrected area intensity is brought down to less than 5%.

The corrected light projection image 912 or data for that image may be stored in the memory, such as memory 315a of IPLD 202 shown in FIG. 5, so the data for the image 912 can be recalled by the central controller 150 during a show or the corrected light projection image 912 or data relating thereto may be sent to the central controller 150 over the communications system via the communications port 311 of FIG. 5 for storage at the central controller 150 and later recalled.

The microprocessor 316 of the IPLD 202 implements the program in memory 315a to control the integral camera, such as camera 364 of FIG. 5 to capture an image of the projection surface 120 before causing projection of light from the projection lamp 345 of FIG. 5. Dashed lines 202c and 202d in FIG. 6 represent the camera field. The correction of the varying intensities of overlapped areas on the projection surface 120 caused by the first light projected by a first IPLD, such as 202, in relation to a light from a second IPLD, such as IPLDs 162 or 182 (or 962) can be done during the creation of the desired scene as created by the operator of the central controller 150. The multiple IPLDs of the invention used to light a required scene can be positioned by the operator as in the prior art to get best coverage on the projection surface 120. Next, the operator of the central controller 150 may choose a first IPLD to perform the "correct intensity uniformity" command. The selection of a particular first IPLD by using addressing techniques by the operator of the central controller 150 is well known in the art. Once the first IPLD is chosen by the operator, the operator next inputs to the central controller 150 though any suitable input device such as a key or touch pad a command to "correct intensity uniformity". The first IPLD should go through the steps of creating a first image, a second image, a third image and a corrected light projection image to be projected as explained in detail above. Next the operator of the central controller 150 may select a second IPLD to perform a "correct intensity uniformity" operation on. This continues until all IPLDs have corrected the intensity uniformity of the light that is projected by each particular IPLD on the projection surface, such as 120. It is also possible to automate the process where a single command is sent to a group of IPLDs to "correct intensity uniformity". In this case the IPLDs can respond one after another automatically by operating address.

It will be appreciated that the above described method of correcting the projected light intensity uniformity on a projection surface by a plurality of IPLDs is preferred as only a "correct intensity uniformity" command is sent to the IPLD from the central controller by the operator reducing the need to send captured camera images over the communication system. Another method might include sending a first image of the integral camera captured image of the uncorrected first light on the projection surface from a first IPLD, such as IPLD 202, to the central controller, such as controller 150. The central controller 150 then processes the first image to correct for nonuniformity and sends to the first IPLD, such as 202, a second light image with the intensity correction required to reduce the intensity in the overlapped areas on the projection surface. The first IPLD, such as 202, then projects the corrected second light image as supplied by the central controller 150.

When multiple IPLDs are used during a show some of the IPLDs may be hung or fixed to moveable trussing. When a particular scene is called up that requires even illumination on a projection surface sometimes the pan and tilt positions of the IPLDs may be slightly altered physically from the original positions used to program the scene. In this case it is possible some IPLDs called up to project their light in a particular scene by the central controller that have been preset using the invention to provide uniform illumination by projecting the second light image, may not align the overlapped areas perfectly. This possible misalignment can cause small visible distractions in intensity uniformity of the projection surface. The misalignment distraction at the overlapped areas can be reduced by providing a gradual reduction of intensity to the overlapped areas. The amount of gradual reduction of intensity in overlapped areas of the projected light from a particular IPLD can be variable by commands sent to the IPLD from the central controller.

I claim:
1. An apparatus comprising
a lighting system comprised of
a plurality of image projection lighting devices including a first image projection lighting device;
wherein each of the plurality of image projection lighting devices can be used to project light onto a projection surface;
wherein the first image projection lighting device is comprised of:
a microprocessor and a camera;
wherein the microprocessor causes the camera to capture a first image of the projection surface and causes the first image projection lighting device to produce a projected light which substantially reduces the nonuniformity of light intensity on the projection surface from the plurality of image projection lighting devices.
2. A lighting device comprising:
a projection lamp;
a light valve;
a processor; and
a camera;
wherein the camera captures a first image of a projection surface, the first image not including projected light from the projection lamp;
wherein the camera captures a second image of the projection surface, the second image including projected light from the projection lamp through the light valve; and wherein the processor compares the first image and the second image to produce a set of data corresponding to a third image;
wherein
the set of data corresponding to a third image is used to produce a projected light image that is projected by the projection lamp through the light valve onto the projection surface.
3. The lighting device of claim 2 wherein
the projected light image is used to correct nonuniformity of light intensity of light from the plurality of image projection lighting devices on the projection surface.
4. A method comprising
remotely positioning the lamp housing of a first image projection lighting device in relation to the base housing to project a first image onto a stage lighting projection surface;
capturing a first image light projected onto the stage lighting projection surface by a camera contained in a lamp housing of at least one of a plurality of image projection lighting devices; and
using the first image to produce a projected light which substantially reduces nonuniformity of light intensity of light on the stage lighting projection projection surface from the plurality of image projection lighting devices.
5. A method comprising the steps of
using a first image projection lighting device to capture a first image of a projection surface, the first image not including projected light from a projection lamp of the first image projection lighting device;
capturing a second image of the projection surface, the second image including projected light from the projection lamp of the first image projection lighting device;
comparing the first image and the second image;
and producing a set of data corresponding to a third image; wherein producing, based on the set of data corresponding to the third image, a projected light image that is projected by the projection lamp through a light valve onto the projection surface.

6. The method of claim 5 wherein the projected light image is used to correct nonuniformity of light intensity of light from a plurality of image projection lighting devices on the projection surface.

7. A method comprising remotely positioning a lamp housing of a first image projection lighting device in relation to the base housing to project a first image onto a stage lighting projection surface;

adjusting the light intensity of light produced by a first image projection lighting device of a plurality of image projection lighting devices in order to provide a more uniform combined intensity of light projected on a stage lighting projection surface from the plurality of image projection lighting devices by using a camera image contained within the lamp housing of at least one of the plurality of image projection lighting devices.

8. The method of claim 7 further comprising adjusting the light intensity of light produced by a second image projection lighting device of the plurality of image projection lighting devices in order to provide a more uniform combined intensity of light projected on a stage lighting projection surface from the plurality of image projection lighting devices by using an camera image captured by at least one of the plurality of image projection lighting devices.

9. The method of claim 7 wherein the light intensity from the first image projection lighting device is adjusted in response to a command from an operator.

10. A method comprising adjusting the light intensity of light produced by a first image projection lighting device of a plurality of image projection lighting devices in order to provide a more uniform combined intensity of light projected on a projection surface from the plurality of image projection lighting devices by using an camera image captured by at least one of the plurality of image projection lighting devices;

comprising adjusting the light intensity of light produced by a second image projection lighting device of the plurality of image projection lighting devices in order to provide a more uniform combined intensity of light projected on a projection surface from the plurality of image projection lighting devices by using an camera image captured by at least one of the plurality of image projection lighting devices;

wherein the light intensity from the first image projection lighting device is adjusted in response to a first command from an operator; and the light intensity from the second image projection lighting device is adjusted in response to a second command from an operator.

11. The method of claim 8 wherein the first image projection lighting device has a first address;

the second image projection lighting device has a second address;

the first address and the second address determine whether the light intensity from the first image projection lighting device or the light intensity from the second image projection lighting device is adjusted first.

* * * * *